Aug. 16, 1932.   P. R. GLASS   1,872,441

FASTENER INSERTING MACHINE

Filed Sept. 10, 1929   9 Sheets-Sheet 2

INVENTOR
Perley R. Glass
By his Attorney
Nelson W. Howard

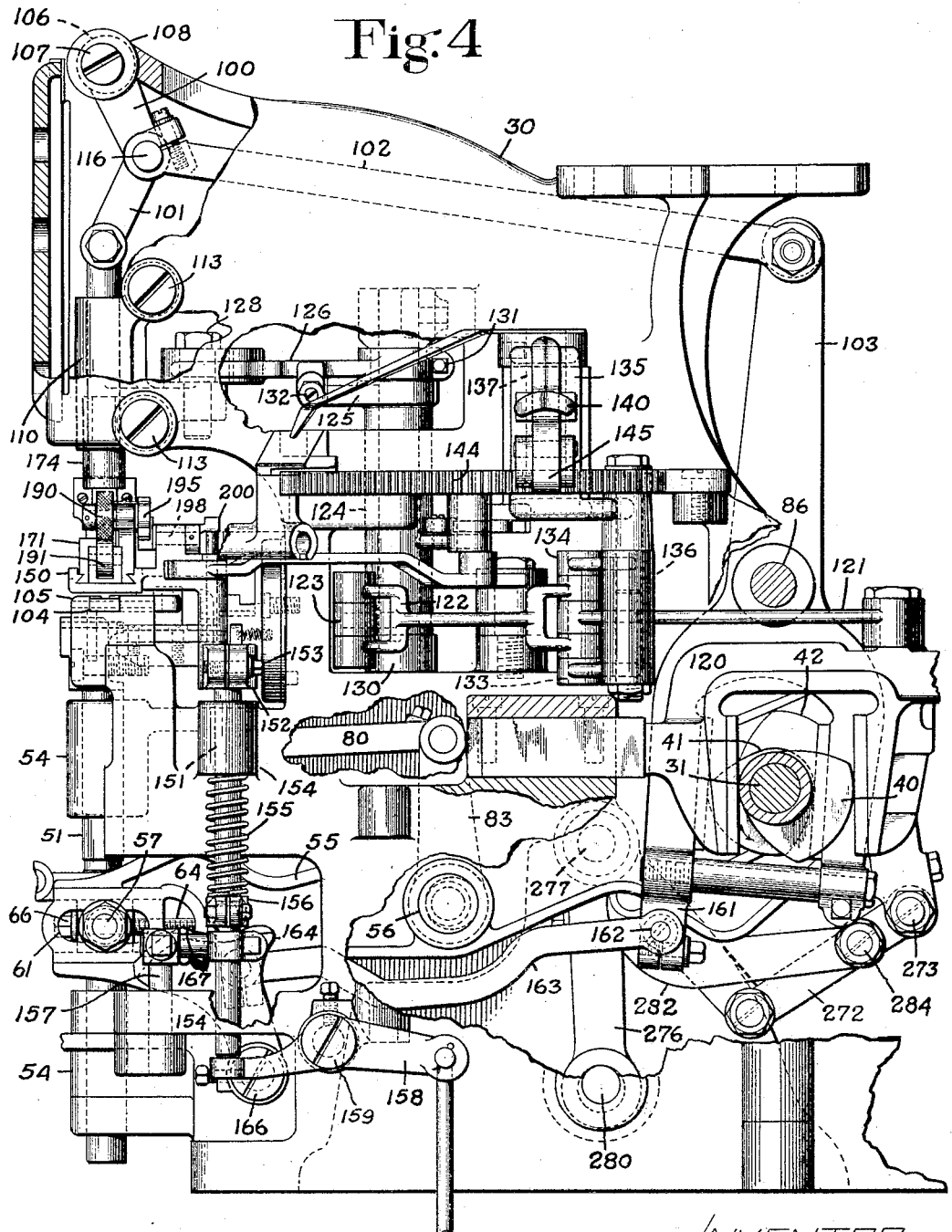

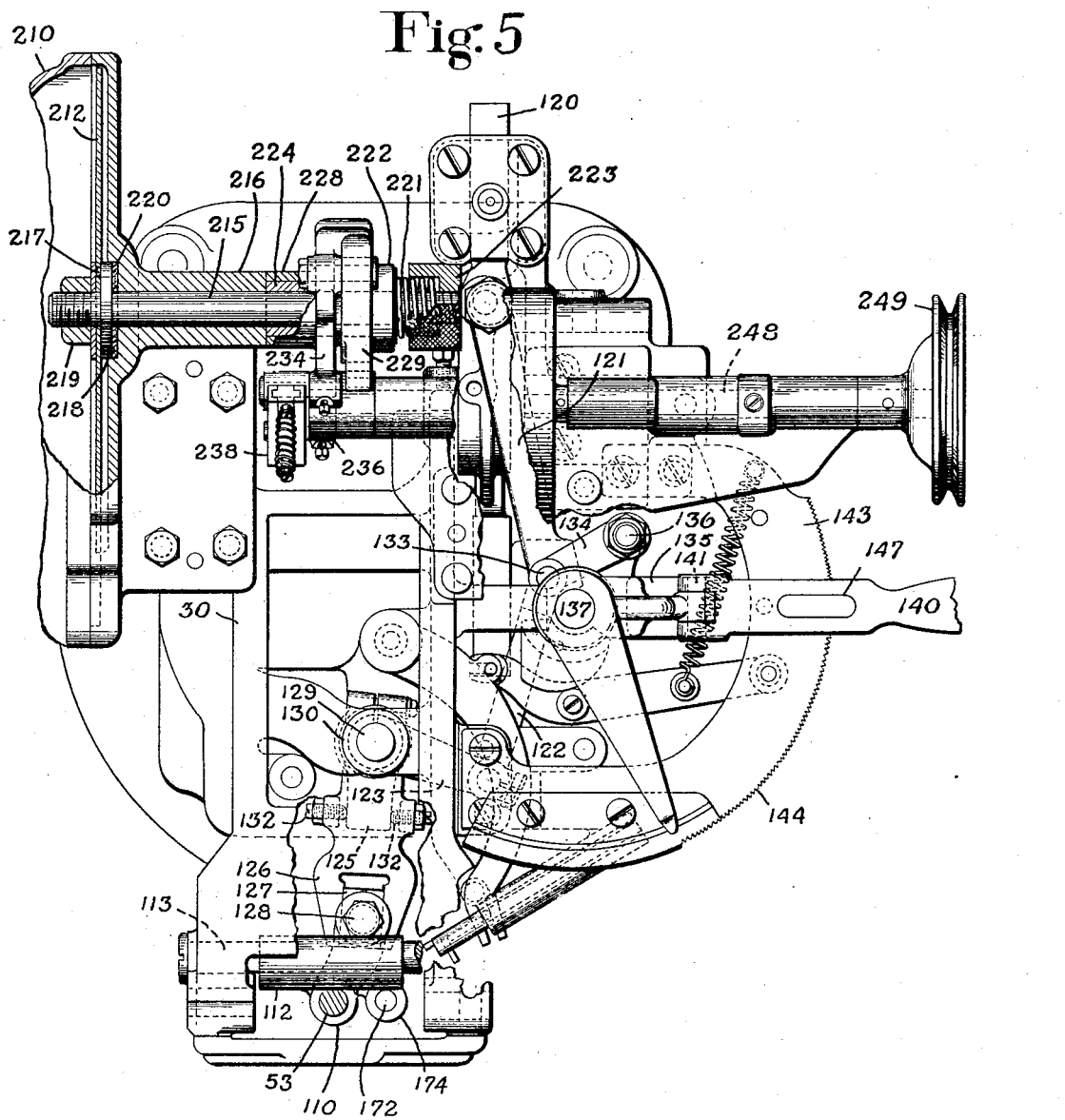

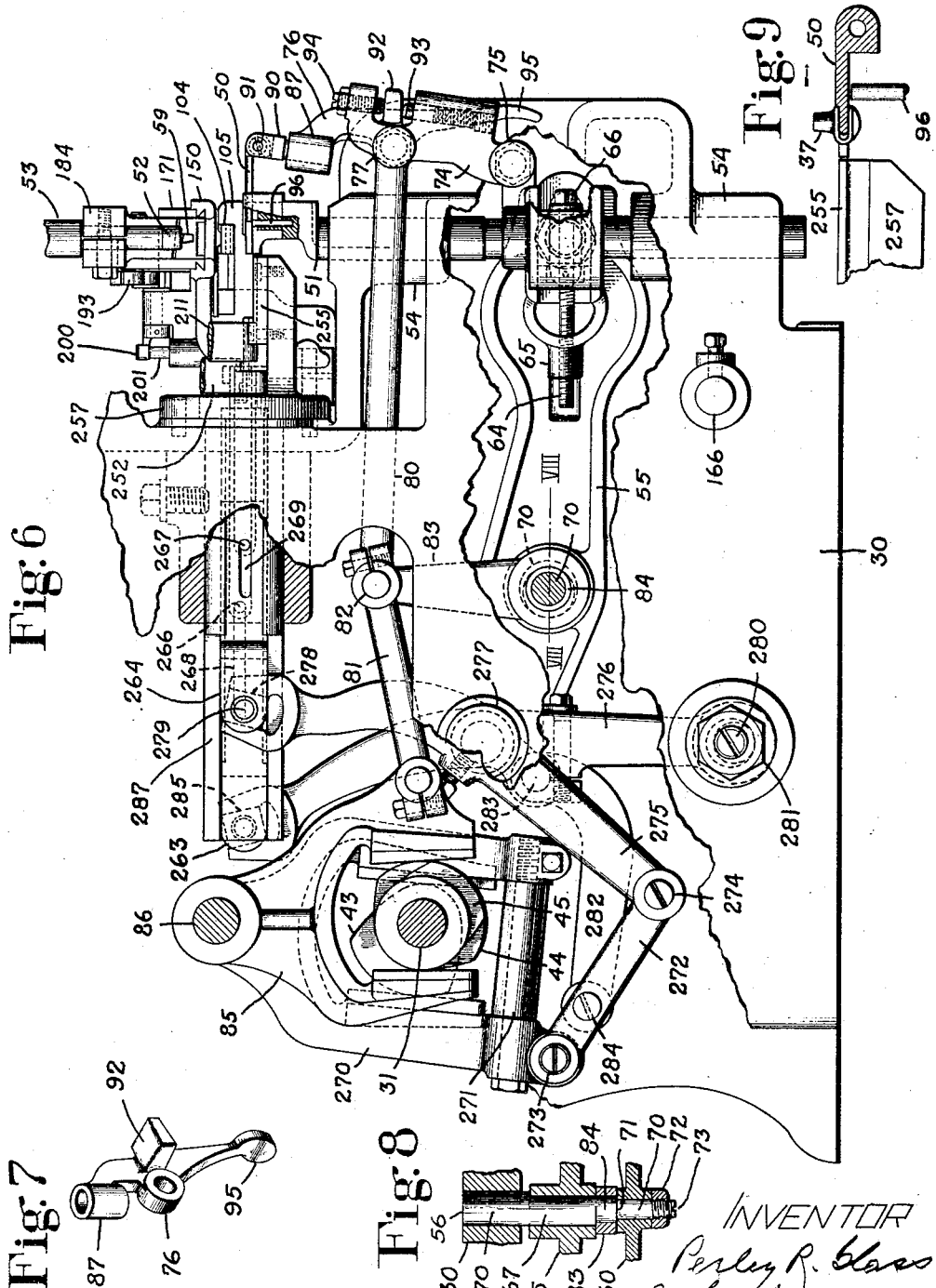

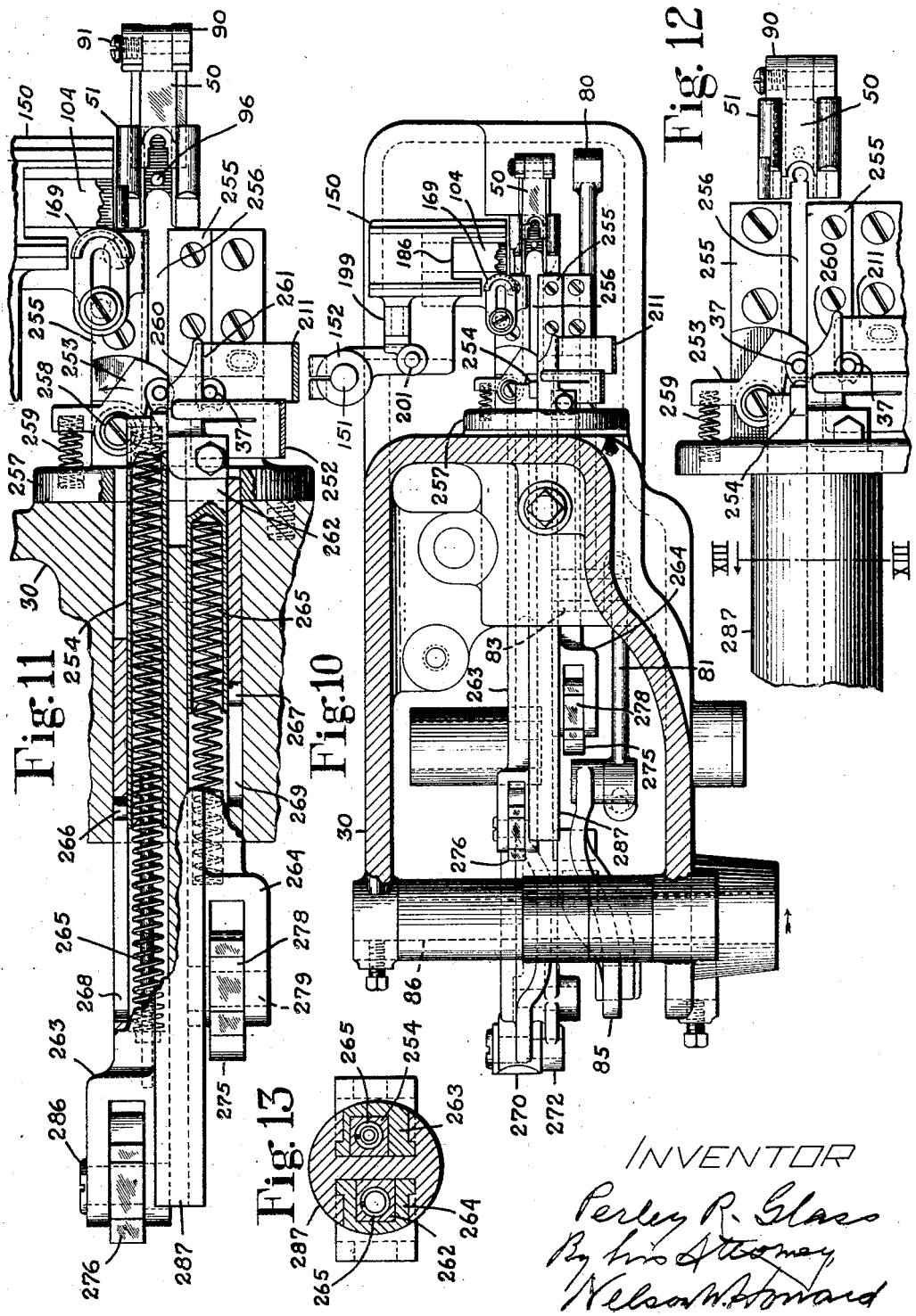

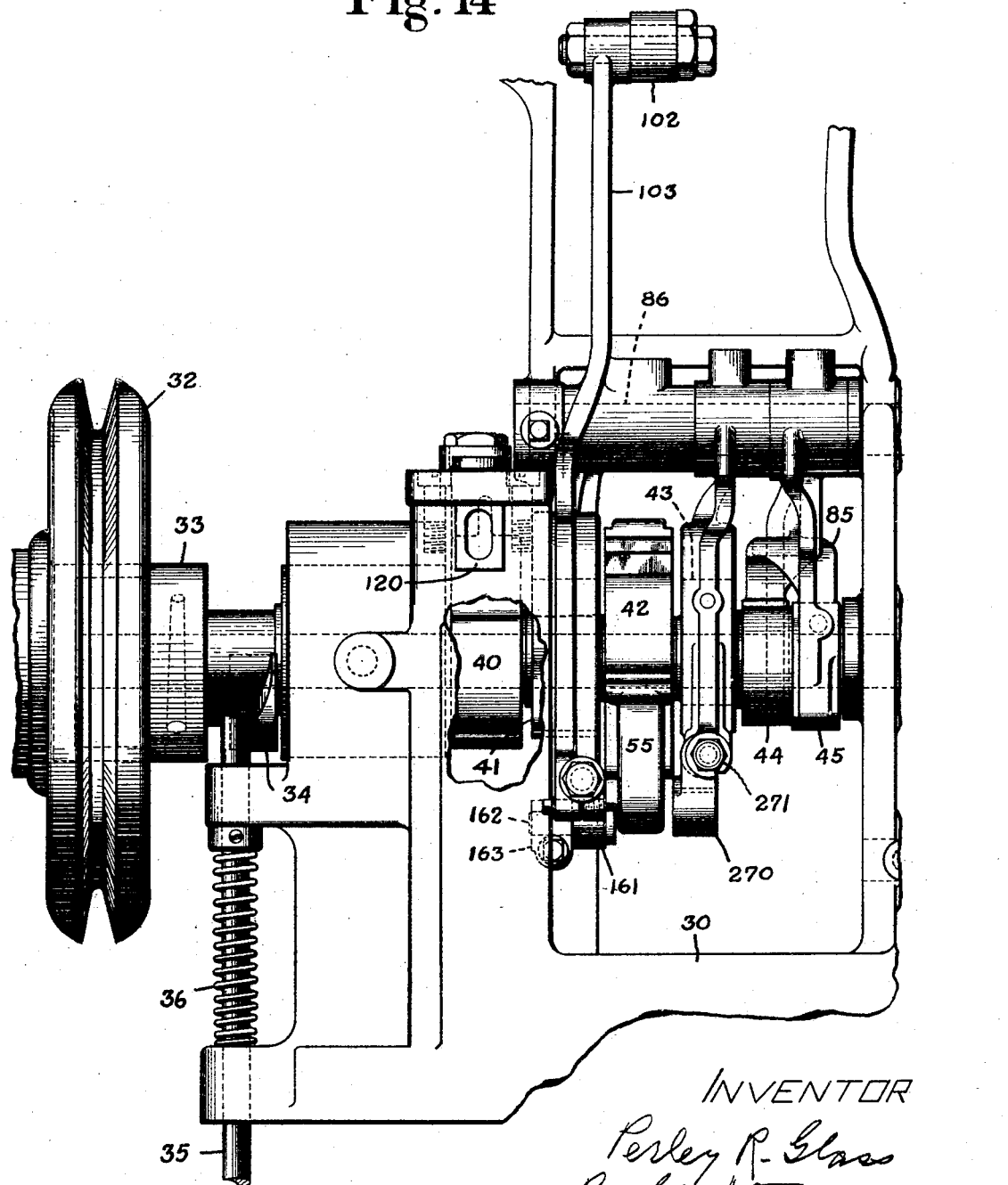

Aug. 16, 1932.   P. R. GLASS   1,872,441
FASTENER INSERTING MACHINE
Filed Sept. 10, 1929   9 Sheets-Sheet 8

Aug. 16, 1932.  P. R. GLASS  1,872,441
FASTENER INSERTING MACHINE
Filed Sept. 10, 1929  9 Sheets-Sheet 9
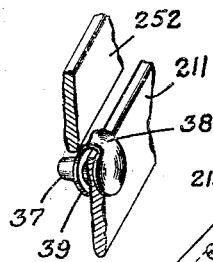
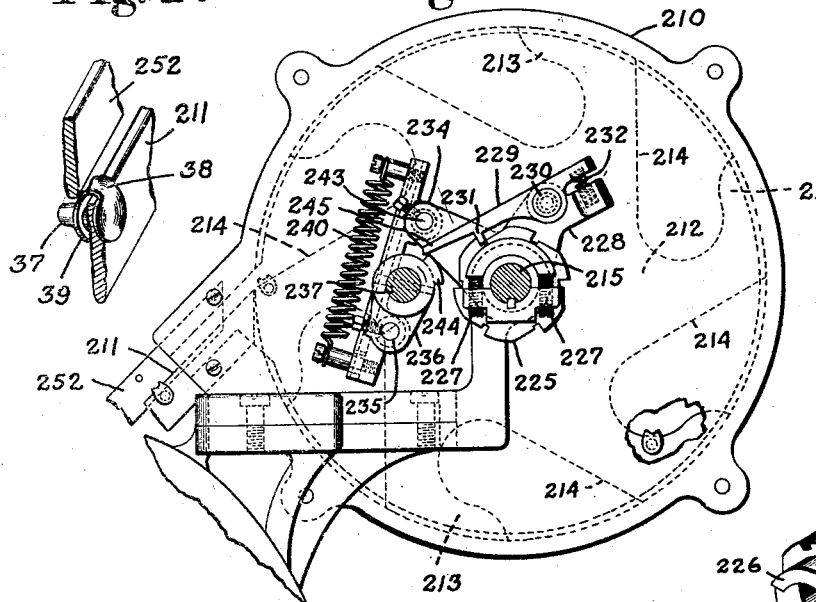
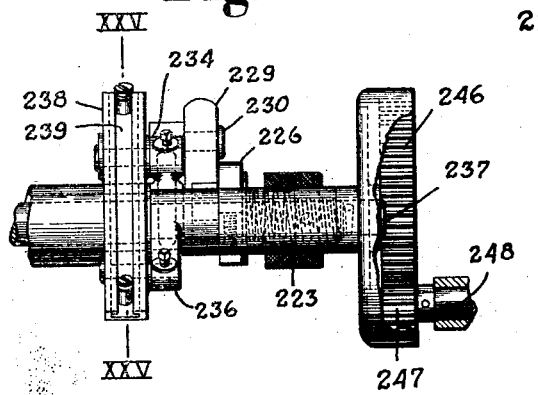
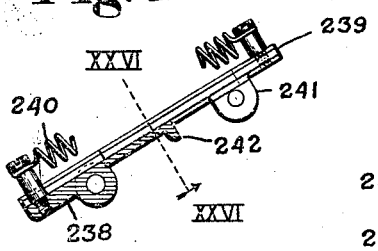
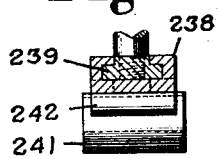

Patented Aug. 16, 1932

1,872,441

UNITED STATES PATENT OFFICE

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY

FASTENER INSERTING MACHINE

Application filed September 10, 1929. Serial No. 391,657.

This invention relates to fastener-inserting machines and is herein illustrated as embodied in an automatic high-speed machine provided with mechanism for inserting and setting lacing-hooks and with mechanism by which the work is fed step by step to space successive lacing-hooks one from another.

In machines of the type referred to the lacing-hooks are commonly transferred from a raceway to an anvil by which they are inserted into the work and clenched against an upsetting tool. The anvil is carried by a plunger to which reciprocatory motion is imparted by suitable mechanism. To insure proper placing of the lacing-hooks on the anvil it is necessary to register the anvil exactly with the raceway. Again, the length of the inserting and clenching stroke of the anvil should be capable of regulation so that the lacing hooks may be clenched tightly in thin work as well as in thick work. In some prior machines the anvil and its plunger have been connected by a yieldable telescopic coupling that is arrested by an adjustable abutment while the plunger is being retracted from the work, the purpose of the abutment being to arrest the anvil in register with the raceway. That construction involves lost-motion and deflection of the yieldable element in every cycle of the machine, and the striking of the abutment increases the noise of operation.

In view of the foregoing an object of the present invention is to do away with the yieldable connection above mentioned and at the same time to provide improved mechanism for reciprocating a fastener-inserting member and a plunger by which it is carried positively in both directions and at the same time to provide for regulating both limits of their travel, as may be required, on the one hand, to insure accurate register of the anvil with a raceway, and on the other hand, to regulate the clenching pressure with regard to the thickness of the work.

In accordance with novel features of the present invention, the illustrated machine is provided with a reciprocatory plunger by which a hook-inserting anvil is carried from the delivery end of a raceway toward a clenching tool and vice versa and power-actuated mechanism by which the plunger is reciprocated positively in opposite directions, the operating mechanism including two individually adjustable devices by which the two limits of the stroke or range of movement of the anvil may be regulated one independently of the other. By eliminating the aforesaid yieldable connection and the arresting abutment with which former hook-setting machines have been provided, the present improved construction eliminates lost motion and repeated hammering actions and noise due to the cooperation of those former elements, while, by incorporating the two adjustable regulating devices into operating mechanism that reciprocates the anvil positively in opposite directions the present construction is relieved from the necessity of repeatedly deflecting a yieldable connection.

In the operation of a machine of the type referred to the anvil occupies the throat of a lacing-hook until the barrel of the hook has been upset and clenched. It is necessary, therefore, to retract the anvil laterally from the throat of the clenched hook before the anvil can return to the position where it receives the next hook from the hook-supplying means.

Preferably, and as herein illustrated, the invention provides improved mechanism for retracting the anvil laterally as above explained, said mechanism being constructed to provide for manual retraction of the anvil so that if, for example, a lacing-hook becomes stuck in the raceway or lodged on the anvil while the machine is being turned over by hand it may be readily dislodged and removed from the machine.

In accordance with other novel features of the invention the illustrated machine is provided with a two-part articulated lever for shifting the anvil in and out, the two parts of the lever having cooperative abutting elements by which they are normally maintained in a constant relation so that under normal operating conditions they are, in effect, the same as a rigid one-piece lever. One of these abutting elements is resilient and is maintained under initial deflection but its resiliency is not called into play except when movement of the anvil in one direction is obstructed, for example, by dirt or chips; or when the operator retracts the anvil manually to remove a lacing-hook that has been delivered to the anvil otherwise than in regular operation. This construction provides for positive in-and-out reciprocation of the anvil under normal conditions but at the same time the resilient abutment provides for yielding when conditions so require.

In latter years it has been common to equip automatic hook-setting machines with mechanism for supplying individual sections or pieces of reinforcing material to shoe uppers at the points where the barrels of the lacing-hooks are inserted therein, the material for such purpose being fed in strip form and severed into sections as the work progresses through the machines. Experience has shown that for work of this kind reinforcing pieces approximately one-half inch square are preferable with regard to furnishing suitable anchorage for the lacing-hooks, and with regard also to economy in the quantity of reinforcing material used and to preserving flexibility of the reinforced portions of the uppers. It is customary, therefore, to sever the pieces of reinforcing material from a strip one-half inch in width, but when, as in the machine herein illustrated, the strip is fed in the same direction as the article of work in which lacing-hooks are to be inserted one aspect of the problem is to restrict the length of the individual sections or pieces of reinforcing material to a uniform standard length preferably about one-half inch. The difficulty in this respect will be appreciated when it is considered that automatic hook-setting machines for commercial purposes must be capable of regulation with respect to the length of the feeding steps imparted to the work and that when, as in the machine herein illustrated, the feeding steps imparted to the strip of reinforcing material are derived from regulatable work-feeding mechanism some provision must be made to nullify the effect of regulating the work-feeding mechanism in so far as the feeding of the strip is concerned, if reinforcing sections all of one standard length are to be severed under all conditions.

It has heretofore been proposed to accomplish the results above set forth by providing one means to advance the strip coextensively with the article of work, and by providing supplemental means to retract the strip a relatively short distance equal to the difference between the standard constant length allotted to the reinforcing pieces and any greater length of the steps imparted to the work. Moreover, in prior machines organized to operate in that manner at least one of the means provided for moving the strip has required piercing the strip as an incident to performing this function.

In view of these considerations a further object of the present invention is to provide improved strip-feeding mechanism that will restrict the length of the individual pieces of reinforcing material to a constant dimension notwithstanding variations in the length of the feeding steps imparted to the work and to do so without piercing the strip and without encumbering the machine with supplemental means for retracting the strip.

To this end a novel feature of the invention consists in improved means constructed and arranged to be operated by regulatable work-feeding mechanism to feed a strip of reinforcing material solely by friction with steps of uniform length under all conditions of feed regulation.

The illustrated machine is provided also with improved mechanism for operating a bladed disk by which lacing-hooks are fed from a hopper into a raceway, but this subject of invention is the subject of a divisional application Serial No. 484,624, filed September 26, 1930.

Referring to the drawings,

Fig. 2 is a right side elevation of the machine portions of which are represented as partly broken away.

Fig. 3 is a vertical sectional view of an adjustable operating connection shown in Fig. 2;

Fig. 4 is a view similar to Fig. 2 but drawn on a larger scale and representing certain portions in vertical section;

Fig. 5 is a top plan view partly in horizontal section showing the general organization of the work-feeding mechanism, and mechanism for feeding lacing-hooks from the hopper to the raceway;

Fig. 6 is a view partly in elevation and partly in vertical section of a portion of the machine as viewed from the left-hand side;

Fig. 7 is a perspective view of one part of an articulated lever shown in its entirety in Fig. 6;

Fig. 8 is a horizontal section through the structure intersected by broken line VIII—VIII of Fig. 6;

Fig. 9 is a vertical section of the hook-supporting member or anvil with an unclenched lacing-hook lodged thereon;

Fig. 10 is a top plan view of the mechanism illustrated in Fig. 6, the frame of the machine being represented in section;

Fig. 11 is a top plan view partly in section of a portion of the mechanism included in Fig. 10;

Fig. 12 is a view similar to the right hand portion of Fig. 11 except that the hook-supporting member or anvil is in a different position;

Fig. 13 is a vertical section through the structure intersected by line XIII—XIII of Fig. 12;

Fig. 14 is a rear elevation of a portion of the frame including a group of cams and levers and a clutch by which the cam shaft is driven;

Figs. 15 and 16 are vertical sections on an enlarged scale showing successive positions of mechanism for feeding a strip of reinforcing material and means for severing the strip into sections;

Fig. 17 is a horizontal section through the structure intersected by broken line XVII—XVII of Fig. 15;

Fig. 18 is an elevation partly in section of ratchet-and-pawl means for operating the strip-feeding roll shown in Figs. 15 and 16;

Fig. 19 is an elevation partly in section of a device for controlling the feeding pawl shown in Fig. 18;

Fig. 20 is a perspective view of the feeding pawl and a controlling arm affixed thereto;

Fig. 21 is a right hand elevation of a hopper from which lacing-hooks are fed to the raceway, the mechanism for operating the feeding device being included;

Fig. 22 is a front elevation partly broken away of the operating mechanism included in Fig. 21, the direction of the view being from left to right of Fig. 21;

Fig. 23 is a perspective view of a ratchet-and-sleeve couple included in the operating mechanism shown in Fig. 21;

Fig. 24 is a view similar to Fig. 1 of the operating mechanism in another position;

Fig. 25 is a longitudinal section of an extensible two-part connecting link intersected by line XXV—XXV of Fig. 22;

Fig. 26 is a cross-section of said link in the plane indicated by broken line XXVI—XXVI of Fig. 25; and Fig. 27 is a perspective view including a portion of the main raceway and a lacing-hook therein.

Figure 1:
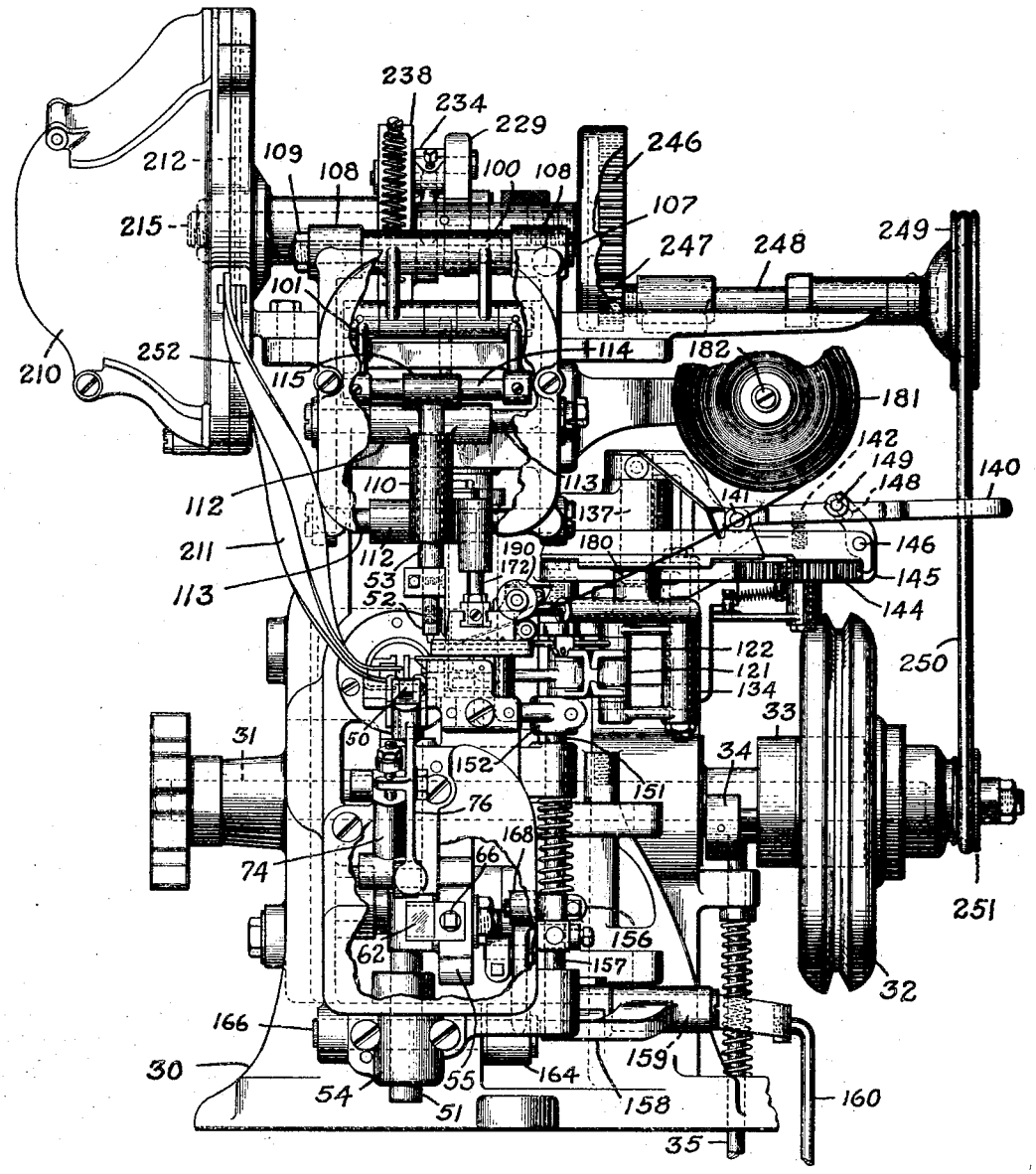
Fig. 1 is a front elevation of a hook-setting machine constructed in accordance with the present invention, certain portions of the machine being represented as broken away.

The general organization and operation of the illustrated machine are as follows. The machine includes a horizontal work-support on which an article of work is periodically clamped and released by a vertically movable presser-foot and along which the work is fed step by step from right to left. The lacing-hooks are inserted upwardly by a hook-supporting member or anvil arranged below the level of the work and carried by a vertically movable plunger arranged in fixed bearings, the hook-inserting locality being near but slightly beyond the left-hand end of the work-support. The barrels of the lacing-hooks are upset and clenched by a tool arranged above the level of the work. This tool is carried by a vertically movable plunger arranged to slide in a bearing formed in a horizontally movable feed-carriage. The clenching tool is provided with a central projection or pilot that serves first to punch a hole in the hook-receiving materials, and thereafter serves to feed the work and to guide the barrel of a lacing-hook through the materials and to the upsetting and clenching surface of the tool. For the purpose of punching a hole in the materials, this punching member cooperates with a solid hardened steel punch-block imbedded in and forming a part of the work-support. The lacing-hooks are deposited one at a time on the aforesaid hook-supporting member when the latter is retracted to its lowest lever. A strip of reinforcing material is fed automatically to the hook-inserting mechanism and is cut into individual sections one for each hook. These sections lie upon the upper surface of the work and are included in the materials that are penetrated by the punching and feeding tool. The mechanism for feeding the strip of reinforcing material is carried by the presser-foot and is operated by the aforesaid feed-carriage.

The main frame 30 is provided with horizontal bearings in its rear portion for a cam-shaft 31. A driving clutch of well-known construction is mounted on the shaft 31 (see Figs. 1 and 14). This type of clutch is more fully illustrated and described in United States Letters Patent No. 1,534,107 granted April 21, 1925 on an application filed by me. The driving member of the clutch is a continuously rotating pulley 32 mounted loosely on the shaft. The driven member 33 of the clutch is affixed to the shaft and carries an axially displaceable wedge member 34 by which the driven member 33 may be coupled to and uncoupled from the driving member 32. A spring contained in the driven member 33, but not shown, tends normally to force the wedge member 34 into coupling position, while a vertically movable controlling rod 35 is arranged to deflect the member 34 and thereby uncouple the clutch. When the controlling rod 35 cooperates with the wedge member 34 as shown in Figs. 1 and 14 it not only uncouples the driving member 32 from the cam shaft but also arrests the rotation of the shaft so that the several mechanisms (not including the mechanism for operating the hopper) are brought to rest in the positions illustrated in Figs. 1, 2, 4, 5, 6, 10 and 15. The controlling rod 34 may be connected to a treadle and is normally raised by a spring 36 into the path of rotation of the wedge member 34, but when it is depressed to release the wedge member, the latter acts automatically to couple the member 33 to the driving member 32.

In Fig. 14, an assemblage of the principal cams is shown in rear elevation. These cams, reading from left to right, are as follows. A cam 40 for operating the work-feeding mechanism, a cam 41 for operating the upper plunger that carries the punching and clenching tool, a cam 42 for operating the lower plunger by which the hook-supporting and inserting member is carried, a cam 43 for operating the mechanism by which the lacing-hooks in the raceway are separated and deposited on the hook-supporting member, and two mated cams 44 and 45 for operating the mechanism by which the hook-supporting member is retracted horizontally from the throat of a clenched lacing-hook. The mechanism for operating the presser-foot derives motion indirectly from the cam 42 and is hereinafter described.

Hook-inserting mechanism

The hook-supporting member 50, commonly termed an "anvil", is shown best in Figs. 2, 6, 9, 10, 11, 12 and 16. This member is a hardened steel plate of rectangular configuration. Its longer margins are arranged to slide in horizontal grooves formed in the upper end of a vertically movable plunger 51. The upsetting and clenching tool 52 is affixed to a vertically movable plunger 53. The plunger 51 is arranged to slide in bearings 54 in the frame 30 and is operated by a lever 55 mounted upon a horizontal fulcrum stud 56. The rear end of the lever 55 is forked and embraces the power-actuated cam 42 as shown in Figs. 2 and 4. The forward end of the lever 55 and the plunger 51 are connected by adjustable means forming a positive operating connection. This connection includes a pivot stud 57 which may be adjusted for the purpose of regulating the amplitude of the reciprocations imparted to the plunger, although the amplitude of the reciprocations imparted to the lever 55 by the cam 42 is constant. The plunger 51 is provided with a horizontal groove 60 (see Fig. 3) and the lever 55 is provided with a corresponding groove and with a slot 61 parallel thereto. The latter groove and the slot are horizontal when the forward end of the lever is at its lowest position. The pivot stud 57 has a rectangular body portion between its ends. This rectangular portion lies in the groove in the lever while one end of the stud extends through the slot 61 and is provided with a screw-thread with which a nut 63 cooperates to clamp the stud to the lever. The other end of the stud is cylindric and projects into a rectangular block 62 arranged to slide on the walls forming the groove 60 in the plunger. Thus, when the plunger 51 is at the lower limit of its range of travel, the groove 60 and the slot 61 are parallel to each other, and this limit cannot be altered by adjusting the stud 57 toward or from the fulcrum 56. When the plunger is in this position, the hook-supporting member 50 should be exactly in register with the delivery end of the raceway 255 as shown in Fig. 9, but if there is any inaccuracy with respect to the registering relation of the member 50 and the raceway it can be corrected by an independent adjustment separate and distinct from that just described. It will be understood that adjusting the stud 57 toward or from the fulcrum stud 56 will regulate the range of travel of the plunger 51 only with regard to the upper limit of such travel.

To facilitate adjusting the stud 57 as above described, the lever 55 is provided with an adjusting screw 64 as shown best in Fig. 6. A boss 65 formed on the lever is bored and tapped to receive the screw 64. The screw 64 extends freely through a hole bored diametrically through the rectangular body of the stud 57 and is provided with a head 66 and a collar engaging opposite sides of the stud. This head is formed to be gripped by a wrench for the purpose of adjusting the stud 57.

The aforesaid independent adjustment for obtaining register of the hook-supporting member 50 with the delivery end of the raceway is obtained by rotational movement of the fulcrum stud 56 (see Fig. 8). For this purpose, the fulcrum stud is formed with an eccentric bearing portion 67 between two concentric portions 70, 70 of different diameters. The stud extends through two spaced portions of the frame 30 which are bored to provide holes of different diameters corresponding to the diameters of the two concentric portions 70, 70 so that the stud may be readily inserted through both portions of the frame. The smaller end of the stud is provided with a clamping shoulder 71 and with a screw-thread on which a clamping nut 72 is arranged. Thus, when the nut 72 is set up tightly the stud is clamped securely to the frame. The operating lever 55 is arranged upon the eccentric portion 67 of the stud. To provide for turning the stud, the smaller end thereof is formed with a groove 73 to receive the tip of a screw-driver.

With this construction, if the hook-supporting member 50 does not register exactly with the raceway as shown in Fig. 9, a slight turning of the stud 56 will correct the error by shifting the range of oscillation of the lever 55, and if, after making an adjustment of this kind, the length of the stroke imparted to the hook-supporting member 50 by the lever is too long or too short with regard to the thickness of the work, the length of such stroke may be regulated by adjusting the pivot stud 57 as hereinbefore described.

The plunger 51 also carries a two-part articulated lever for retracting the hook-supporting member 50 from the throat of a clenched hook. This lever is shown best in Figs. 6 and 7. One part 74 of the articulated lever is connected to the plunger 51 by a fulcrum stud 75. The other part 76 of this lever is connected to the part 74 by a pivot stud 77. The articulate joint formed by the stud 77 provides for relative movement of the component parts of the lever for purposes hereinafter described, but during the normal operation of the machine this lever is operated in its entirety by mechanism now about to be described.

One end of a link 80 is pivotally connected to the articulated lever by the stud 77, while the other end of the link is pivotally connected to a second link 81 by a pivot pin 82 which extends through a rocker arm 83 loosely mounted upon a concentric portion 84 of the stud 56 as shown in Fig. 8. The link 81 is reciprocated lengthwise by a forked lever 85 mounted upon a fulcrum rod 86 and operated by the mated cams 44 and 45.

The part 76 of the articulated lever is provided with a sleeve portion 87 in which the stem of a coupling member 90 is arranged to slide. The member 90 and the hook-supporting member 50 are operatively connected by a pivot pin 91. The part 76 is also provided with a rigid abutment 92 (Fig. 7) the under surface of which is engaged by a spring-pressed abutment 93 carried by the part 74. The upward stress exerted by the abutment 93 normally maintains the abutment 92 against a rigid abutment 94 carried by the part 74. The abutment 94, as shown in Figs. 2 and 6, is in the form of a screw to provide for adjusting the part 76 relatively to the part 74 so that when the articulated lever is at the rearward limit of its range of oscillation the rear edge of the anvil 50 may almost but not quite touch the delivery end of the raceway to receive a lacing-hook from the raceway (see Fig. 9).

The oscillations imparted to the part 74 of the articulated lever are positive under all conditions, while those imparted to the part 76 are positive during normal operation of the machine. On the other hand, under certain abnormal conditions, relative movement of the component parts of the lever may occur. For example, if movement of the anvil 50 toward the raceway were obstructed by a misplaced or deformed lacing-hook or by a chip or other element, continued movement of the part 74 to the rear would be dissipated in deflecting the spring-pressed abutment 93.

Again, the part 76 of the articulated lever is provided with a downwardly extending finger-piece or handle 95 conveniently arranged to be moved manually toward the rear whenever it is desired to retract the anvil 50 from the delivery end of the raceway while the machine is at rest. For example, it sometimes happens, when testing a machine for the first time with lacing-hooks of a size or type different from those formerly used in the machine, that an adjustment of one kind or another may be necessary to insure smooth running of the lacing-hooks, and that before all the necessary adjustments have been made a test hook may become lodged on the anvil 50. In such a case, the lacing-hook so lodged may be dislodged by manually moving the finger-piece 95 to retract the anvil from the raceway without operating any other part of the machine. When the anvil 50 is thus retracted any lacing-hook that may be lodged thereon will be stripped from it by a pin 96 (Figs. 6 and 9) arranged under said member and affixed to the plunger 51.

It is to be noted that the spring-pressed abutment 93 is not called upon for any deflection during normal operation of the machine. In practice the deflections of this element are so few and so infrequent that the spring does not undergo any appreciable deterioration with respect to its power or its resilience.

The upper plunger 53 carrying the punching, feeding and clenching tool 52 is reciprocated vertically by a train of mechanism (see Figs. 1, 2 and 4) comprising toggle members 100, 101, a link 102, a lever 103 and the cam 41. The lever 103 is mounted upon the fulcrum rod 86 and is provided with a forked portion that embraces the cam 41 and maintains contact with the cam at two opposite points to insure positive action of the lever in both directions of its motion.

The formation of the tool 52 is shown best in Figs. 15 and 16. The tool is provided with an annular upsetting and clenching surface 58 and with a central pilot portion 59 that serves to punch holes in the hook-receiving materials as shown in Fig. 16 and also serves to feed said materials as hereinafter explained. In punching a hole for the reception of the barrel 37 of a lacing-hook, the portion 59 cooperates with a solid fixed punch-block 104 imbedded in a portion 105 of the machine frame, the punch-block and the portion 105 constituting a work-support.

In the operation of a machine of this type, the lower limit of vertical movement of the punching tool must be regulated with regard to the level of the punch-block. Accordingly, to provide for such regulation, the toggle member 100 is arranged upon an eccentric portion 106 (see Fig. 4) of a pivot stud 107 which may be adjusted rotatively. The end portions of the stud 107 are concentric in relation to each other and are arranged respectively in bearing portions 108 formed in the frame 30. Referring to Fig. 1, the left hand end of the stud 107 is provided with a screw thread and with a nut 109 by which it may be clamped to the frame in any position of adjustment.

The plunger 53 is arranged to slide vertically in a bearing portion 110 forming a part of a horizontally movable feed-carriage which also comprises horizontal sleeve portions 112 arranged to slide on parallel guide rods 113. These guide rods are affixed to the frame 30.

As shown in Fig. 1, the toggle member 101 is in the form of a yoke having two arms spaced apart and connected by a horizontal pivot pin 114. The intermediate portion of the pin 114 extends through a sleeve portion 115 formed on the upper end of the plunger 53. This construction maintains an operating connection between the toggle mechanism and the plunger 53 and at the same time provides for horizontal reciprocations of the plunger without burdening the work-feeding mechanism with the weight of the toggle mechanism.

A pivot pin 116 forming the knee of the toggle mechanism stands initially at the rear of the dead-center position as shown in Figs. 2 and 4 but the operating movement imparted to this pin by the link 102 is sufficient to carry the center of the pin across and slightly beyond the dead-center position. The stud 107 having the eccentric portion 106 will be adjusted to cause the punching portion 59 to engage the punch-block 104 when the knee of the toggle mechanism is at the dead-center position, so that the slight movement of the pin to the front of the dead-center position will relieve the pressure of the punching-portion 59 upon the punch-block and thus facilitate the feeding movement of the portion 59.

When the parts are in their initial positions, the upper plunger 53 is at the upper limit of its range of vertical movement, and the lower plunger is very slightly above the lower limit of its range of movement. Moreover, at this time the feed-carriage stands at the right-hand limit of its range of travel so that the punching and feeding tool will be in register with the punch-block 104 as shown in Fig. 15. When the machine is set in operation, the upper plunger 53 executes its punching motion and immediately rises very slightly in consequence of moving the knee of the toggle slightly beyond the dead-center position. While the punching motion is occurring, the hook-supporting member 50, which stands initially in the position shown in Fig. 6, completes its downward travel and moves toward the delivery end of the raceway to receive a lacing-hook which is deposited thereon by mechanism to be described. As soon as the pressure of the punching-portion 59 upon the punch-block has been relieved, the feed-carriage moves from right to left thereby feeding the punched materials and placing the upsetting and clenching tool 52 in register with the lacing-hook which is deposited on the hook-supporting member 50, as shown in Figs. 9 and 16, while the work-feeding operation is in progress.

While the tool 52 remains stationary in the position shown in Fig. 16 the lower plunger 51 rises to insert the barrel 37 of the hook into the work and to upset and clench the barrel. The lower plunger 51 dwells through a short period while it is at the upper limit of its inserting and clenching stroke, and during this period of dwell the knee 116 of the toggle mechanism returns to its initial position. This return movement causes a slight downward motion of the tool 52 prior to the retractory movement thereof and thereby causes a supplemental clenching of the barrel of the hook which has already been upset and clenched by the upward movement of the hook-supporting member 50.

While the tool 52 is rising from the clenched hook, the hook-supporting member 50 is retracted from the throat of the hook by the mechanism comprising the two-part articulated lever 74, 76 (Fig. 6). When the hook-supporting member 50 has been retracted far enough to clear the clenched hook, the lower plunger 51 descends to its initial position shown in Fig. 6, and during the same period the feed-carriage returns to its initial position thereby placing the tool 52 again in register with the punch-block 104 as shown in Figs. 1 and 15.

*Work-feeding mechanism*

The feed-carriage indicated by the numerals 110 and 112 is operated by a well-known form of mechanism substantially like that illustrated and described in United States Letters Patent No. 1,228,768 granted June 5, 1917 on my application. This mechanism is herein illustrated in Figs. 1, 2, 4, 5 and 14. The operating motion is derived from the cam 40 and is transmitted by a train of parts including a slide 120, links 121 and 122 arranged in series, an arm 123, an oscillatory sleeve 124 to which the arm 123 is affixed, an arm 125 formed on the upper end of the sleeve (see Fig. 4), a forked arm 126, a block 127 (Fig. 5) embraced by the forked end of the arm 126, and a pivot stud 128 by which the block 127 is pivotally connected to the feed-carriage. The sleeve 124 is mounted on a vertical rock-shaft 129 but is not directly connected thereto. The upper and lower ends of the rock-shaft 129 are journaled in bosses 130 formed on the frame 30. The forked arm 126 is formed with a split hub and is provided with a bolt 131 by which the hub may be contracted to grip the rock-shaft 129. An adjustable operating connection between the arms 125 and 126 is provided by oppositely arranged set-screws 132 carried by the arm 126 and arranged to abut against opposite sides of the arm 125 as shown in Fig. 5. This operating connection provides for regulating the relation between the two arms so that the tool 52 (Fig. 16) may be registered with the hook-supporting member 50.

A pivot pin 133 connecting the links 121 and 122 extends through a guiding member 134 by which the length of the feeding stroke imparted to the feed-carriage may be regulated. The member 134 is carried by a manually movable regulating lever 135 to which it is connected by a pivot stud 136. The lever 135 is mounted on a vertical fulcrum pin 137 having a bearing in a portion 138 of the frame. The distance between the axes of the members 136 and 137 is commensurate with the distance between the axes of the members 136 and 133. Moreover, when the cam slide 120 is at the forward limit of its travel, the pivot member 133 and the pivot member 137 are coaxial, so that regulating movement of the lever 135 does not cause any change in the left-hand limit of feeding movement imparted to the feed-carriage but affects only the right-hand limit thereof.

An operating handle 140 is connected to the regulator 135 by a horizontal pivot pin 141 to permit up-and-down movement of the handle. This movement is utilized to secure the regulator in the various positions of adjustment to which it may be moved. As shown in Fig. 1, a compression spring 142 is interposed between the handle and the regulator, each of which is provided with a socket for one end of the spring. A sector 143 is arranged under the regulator 135 and its outer edge is formed with teeth 144 to cooperate with complemental teeth formed on a detent 145. The detent is carried by the regulator and is connected thereto by a pivot pin 146 (Fig. 1). The upper end of the detent extends through a recess 147 (Fig. 5) formed in the handle 140 and is formed with a slot 148 to cooperate with a pin 149 carried by the handle. The spring 142 normally raises the handle and thereby maintains the detent 145 in engagement with the toothed edge of the sector 143, thereby locking the regulator against angular movement, but when the handle 140 is depressed it disengages the detent from the sector so that the handle may then be moved horizontally to impart regulating movement to the regulator 135.

*Presser-foot*

A presser-foot 150 is arranged to cooperate with the work-support 104, 105. Its details of construction are shown best in Figs. 4, 10 and 18. The presser-foot is affixed to the upper end of a lifting rod 151, for which purpose it is formed with a split hub 152 and is provided with a bolt 153 by which the hub may be contracted to grip the rod. The upper and lower portions of the rod 151 are arranged to slide in bosses 154 formed on the frame 30. A compression spring 155 surrounds the rod and is compressed between the upper boss 154 and a collar 156 affixed to the rod. To prevent the rod from turning about its axis a pin 157 is affixed thereto in parallel relation to the rod and is arranged to slide in a guide hole formed in the lower boss 154.

As shown in Figs. 1, 2 and 4, a manually movable lever 158 is arranged to operate against the lower end of the rod 151 to lift the presser-foot from the work-support so that a guiding edge of the work may be placed against an end-gage 169 on the work-support 105 (see Figs. 10 and 11). The lever 158 is mounted upon a fulcrum member 159 and is provided with a rod 160 for connecting it with a treadle not shown.

The machine is also provided with automatic mechanism for lifting the presser-foot immediately prior to the work-feeding operation. This mechanism derives its operating motion from the mechanism by which the punching-tool is operated. As shown in Fig. 4, the lever 103 is formed with an extension 161 at its lower end to receive a pivot pin 162 by which a connection is made with a link 163. The forward end of this link is connected to a rocker 164 by a pivot pin 165. The rocker is mounted upon a fulcrum stud 166. A camming surface 167 formed on the rocker cooperates with an anti-friction roller 168 (Fig. 1) carried by the collar 156. This mechanism causes the presser-foot to rise during the final stages of downward movement of the punching-tool and also permits the presser-foot to descend during the first stages of upward movement of said tool.

*Strip-feeding and severing mechanism*

As hereinbefore stated, the illustrated machine is provided with mechanism for feeding a strip of reinforcing material to the hook-setting mechanism and for severing the strip into individual sections, one for each lacing-hook inserted into the work. This mechanism, with the exception of the cutter for severing the strip, is preferably mounted upon the presser-foot 150 which, for reasons that will appear, is formed with a dovetail groove 170 to receive a correspondingly shaped dovetail portion of a slidable block 171 (see Figs. 4, 15 and 16). This block and the parts carried by it are therefore supported by the presser-foot so as to move up and down with the latter, but the dovetail connection permits the block to partake of the to-and-fro movements of the feed-carriage. An articulated operating connection between this block and the feed-carriage causes the block to slide on the presser-foot with strokes of the same length as those imparted to the feed-carriage. The connection last referred to includes a vertical pin 172 and a smaller block 173 mortised into the block 171 by means of horizontal tongues and grooves extending at right angles to the lines of feeding movement imparted to the feed-carriage. The upper portion of the pin 172 has telescopic engagement with a sleeve 174 formed on the feed-carriage. The lower portion 175 of this pin is eccentric in relation to the upper portion. Consequently, by turning the pin, a shearing plate 176 carried by the block 171 may be adjusted toward or from a cutter 177 carried by the plunger 53. A set-screw 178 in the block 173 provides for maintaining the pin 172 against accidental turning.

A strip 180 of reinforcing material, preferably a coarse woven fabric rendered moderately stiff by a sizing, may be drawn from any convenient source of supply. As shown in Fig. 1, a coil 181 of such material is supported by a horizontal pivot 182 projecting from a bracket secured to the frame. The strip 180 is led through a groove in the block 171 and its leading end projects normally beyond the punching element 59 as shown in Fig. 15. The outlet from the groove in the block 171 is formed by a narrow slot 179 in the shearing plate 176.

The cutter 177 is affixed by screws 183 to a split collar 184 which surrounds the plunger 53 and is provided with a screw 185 by which it may be contracted to grip the plunger. The parts are so related that while the plunger 53 is executing its punching stroke, the cutter 177 co-operates with the shearing plate 176 to sever the projecting portion of the strip 180. The severed portion drops through a recess 186 formed in the presser-foot (see Fig. 15) and lies upon the article of work previously placed on the punch block 104. In Figs. 15 and 16, an article of work such as a shoe-upper is indicated at 187 and a severed section of reinforcing material is indicated at 188. In cooperating with the punch-block 104, the punching-portion 59 passes through the severed piece 188 before encountering the article of work 187. Consequently, when the work-feeding mechanism operates to shift the tool 52 into register with the hook-supporting member 50, the punching-portion 59 carries the severed piece 188 with the work 187 and thereafter guides the barrel 37 of a lacing-hook through all the materials punched for its reception.

The to-and-fro motions of the block 171 in the dovetail groove 170 in the presser-foot are utilized to feed the strip of reinforcing material to the fastener-inserting mechanism. The strip-feeding mechanism comprises a pair of grippers, by which the strip is clamped continuously, one a feed-roll 190 and the other an idle presser-roll 191. Both of these rolls are made of metal, the feed-roll 190 being preferably made of hardened steel and having a roughened or nurled periphery. The feed-roll is affixed to a shaft or stem 192 journaled in a bearing formed in the block 171. A ratchet 193 formed on the stem 192 is engaged by an operating pawl 194 and by a retaining pawl 195. The retaining pawl is carried by the block 171 and is connected thereto by a pivot pin 196. A leaf-spring 197 bears on the retaining pawl to maintain it in engagement with the rachet.

The operating pawl 194 is formed on a stem 198 which is journaled in a boss 199 formed on the presser-foot (see Fig. 10). A block 200 pinned to the stem 198 is engaged by a spring-pressed plunger 201 projecting upwardly from a socket formed in the presser-foot. The plunger 201 tends to turn the stem 198 in the direction indicated by an arrow in Fig. 19 but the movement in this direction is arrested by a foot 202 formed on the block 200. For this purpose the presser-foot is provided with a horizontal surface 203 against which the foot 202 abuts when the pawl 194 is upright as shown in Figs. 15, 18 and 20.

The presser-roll 191 is arranged to maintain upward pressure of the strip 180 against the feed-roll 190. For this purpose the presser-roll is journaled in a kerfed holder 205 carried by the block 171, the holder being connected to the block by a pivot pin 206. Pressure of the roll 191 against the strip 180 is maintained by a compression spring 207 arranged to act against the holder 205.

The strip-feeding mechanism operates as follows, assuming that the parts are in their initial positions as shown in Fig. 15. It is to be observed that the feeding pawl 194 is disengaged from the ratchet 193 and that it is maintained in an upright position by the spring-pressed plunger 201 (Fig. 19). When the machine is set in operation, the plunger 53 descends thereby causing the cutter 177 to sever the projecting left-hand portion of the strip 180, and also causing the punching-portion 59 to punch a hole in the severed piece and in the article of work 187 lying on the punch-block 104. The punching and severing operations are followed by upward movement of the presser-foot and by feeding movement of the feed carriage 110, 112 from right to left. Since the block 171 is operatively connected to the feed-carriage by the pin 172 and the sleeve 174, the block 171 and all the elements carried thereby will move from right to left with the work, but the presser-foot 150 and the feeding pawl 194 will remain stationary, except that the pawl will be turned in a counterclockwise direction by the ratchet 193 as the latter passes over it (see Fig. 16).

During the movement of the block 171 from right to left, rotation of the feed-roll 190 is prevented by the retaining pawl 195. Consequently, the strip 180, being gripped by the rolls 190 and 191, will be carried with the work a distance equal to the length of the work-feeding stroke and at the same time the feeding pawl 194 will slide past one tooth of the ratchet 193 and engage the ratchet as shown in Fig. 16. After a lacing-hook has been inserted and clenched in the materials arranged for its reception as shown in Fig. 16, the presser-foot descends into engagement with the work, the upper plunger 53 and the lower plunger 51 are retracted from the work and the feed-carriage returns to its initial position.

During the return movement of the feed-carriage the block 171 also returns to its initial position, thereby causing the feeding pawl 194 to take up the lost motion between its tip and the ratchet-tooth immediately in front of the tip, and thereafter to rotate the ratchet and the feed-roll through an arc corresponding to the prescribed length of one section 188 of the strip. During that period required to take up the lost motion between the feeding pawl and the tooth immediately in front of it, the rolls 190 and 191, still gripping the strip 180, carry the strip a corresponding distance from left to right, but while the roll 190 is being turned in a clockwise direction by the feeding pawl the strip 180 is advanced relatively to the block 171 so that its leading end will be projected under the tool 52 as shown in Fig. 15. Although this mechanism moves the strip lengthwise in opposite directions in every cycle the net feeding movements of the strip are relatively short, their length in every case corresponding to the distance between successive teeth of the ratchet.

If the work-feeding mechanism is regulated to impart relatively short feeding steps, for example steps one-half inch in length, the return movement of the feed-carriage and of the block 171 will cease at the instant when the feeding pawl arrives at its upright position as shown in Fig. 18, and under these conditions the initial positions of the parts will be as represented in this figure.

On the other hand, if the work-feeding mechanism is regulated to impart longer feeding steps the return movement of the feed-carriage and of the block 171 will continue after the ratchet and the feeding pawl reach the positions represented in Fig. 18. However, the subsequent stage of return movement will not result in any additional turning of the feed-roll 190 but will result merely in disengaging the ratchet 193 from the feeding pawl 194 as shown in Fig. 15. According to this figure, the turning of the pawl 194 in a clockwise direction is arrested by contact of the foot 202 with the surface 203 (Fig. 19) of the presser-foot. Consequently, in no case will the net feeding movement imparted to the strip 180 be more or less than that for which the mechanism is designed, since any prolongation of the return movement of the feed-carriage and of the block 171 after the feeding pawl has advanced the ratchet through a distance corresponding to the length of one section 188 will result in carrying the strip 180 from left to right through the remainder of such return movement.

Hopper and raceway

The illustrated machine is provided with improved means for supplying lacing-hooks to the hook-inserting mechanism. As shown in Figs. 1 and 2 a hopper 210 is arranged at the rear of the machine and above the level of the hook-inserting locality so that the lacing-hooks may gravitate through an inclined raceway 211 into which they are delivered by mechanism now about to be described.

Referring to Figs. 5 and 21, the hopper 210 is provided with a rotary disk 212 of well-known type having a series of hook-shaped blades 213 arranged to dip into a mass of lacing-hooks lying in the hopper, the blades being formed to pick up some of the hooks by entering the throats of those that lie in certain positions. The disk 212 is rotated intermittently about a horizontal axis and its straight edges 214 are thereby brought successively into register with the upper end of the raceway 211, as shown in Fig. 21, and are permitted to dwell in that position while the lacing-hooks lying on said edges gravitate into the raceway. To insure the passage of the lacing-hooks from the blades of the disk 12 to the raceway the utmost accuracy with respect to registering the edges 214 with the raceway is necessary, since if, through faulty register, a hook becomes obstructed at the point of transfer it will not only interrupt the delivery of lacing-hooks to the raceway but will also, in some cases, obstruct the subsequent turning of the disk 212 and bend or break a blade 213 or the raceway.

To guard against faulty register, the illustrated hopper is provided with improved mechanism for intermittently rotating the disk 212. The disk is affixed to a shaft 215 journaled in a bearing 216 formed on the hopper, relative rotation of the disk and the shaft being prevented by a key 217 projecting through the disk from a collar 218 integral with the shaft. The disk 212 is detachable from the shaft but is secured thereto by a nut 219 arranged to clamp it against the collar 218. A washer 220 of friction material, such as leather, is interposed between the collar 218 and the bearing 216 for the purpose of maintaining the disk frictionally against accidental turning movement during its periods of dwell. End-thrust of the collar 218 against the washer 220 is maintained by a compression spring 221 surrounding the shaft 215 and compressed between a collar 223 and a head 222 of a sleeve 224. This collar is affixed to the shaft but the sleeve 224 is sustained against endwise movement by the bearing 216. The sleeve 224 is splined to the shaft and is surrounded by, and furnishes a bearing for, a ratchet wheel 225 (Fig. 23), the number of teeth in the ratchet being equal to the number of blades 213 with which the disk 212 is provided. A segmental flange 226 formed on the ratchet wheel is arranged to be engaged by two adjusting screws 227 carried by the sleeve 224. This construction constitutes an articulated coupling which provides for regulating the angular relation between the ratchet wheel and the bladed disk 212 so that the edges 214 of the disk may be set to insure their alinement with the raceway 211.

The exterior of the sleeve 224 also furnishes a bearing for the hub portion of an oscillatory pawl-carrier 228. An operating pawl 229 is mounted on a pivot pin 230 carried by the carrier 228 and is provided with a square lug 231 arranged to cooperate with the teeth of the ratchet-wheel. A compression spring 232 carried by the member 228 and bearing against the pawl 229 maintains the lug 231 normally in engagement with the ratchet-wheel as shown in Fig. 24.

The teeth of the ratchet-wheel are separated from each other by square notches 233 of a width equal to the thickness of the lug 231 so that when the lug is in the act of driving the ratchet-wheel it will control the rotation thereof positively and thereby prevent overrunning of the disk 212 when the pawl reaches the limit of its operating stroke.

The pawl-carrier 228 is formed with an arm 234 by which it is oscillated. Operating motion of the pawl-carrier is derived from an eccentric wrist-pin 235 carried by an arm 236 affixed to a continuously rotating shaft 237. The operating connection between the wrist-pin 235 and the arm 234 is formed by an extensible link comprising two tongue-and-groove parts 238 and 239 (Figs. 25 and 26) and a tension spring 240 connecting said parts. Fig. 25 shows the connecting link as drawn out to an abnormal length, whereas under normal conditions the spring 240 maintains the lug 241 of the part 239 against the abutment 242 formed on the part 238. The part 239 of the extensible link is connected to the arm 234 by a pivot pin 243. If, while the mechanism is operating, an obstruction prevents rotation of the disk 212 the operating motion of the wrist-pin 235 will be dissipated in distension of the extensible link so that the disk will not be forced to undergo any stress so severe as to cause damage of the parts.

The radius of the arc through which the pivot pin 243 travels is considerably greater than the radius of the circle in which the wrist-pin 235 travels. Consequently, although the wrist-pin travels at a uniform rate of speed the operating pawl 229 is caused to move to and fro with motions that are initially slow but which the gradually accelerative through the first half of the range of travel and which diminish in speed to the terminal limits of the strokes. Thus, the disk 212 also begins and ends each step of rotation at slow speed, although the intermediate stages of each step are first accelerative and then decelerative. Moreover, as hereinbefore stated, overrunning of the disk 212 is prevented by the square notches 233 into which the lug 231 of the driving pawl projects during the driving periods, and it is to be observed that the disk 212 is brought to a state of rest positively by the operating pawl while the lug 231 is seated in one of the notches 233.

After the completion of each operating stroke of the pawl, and while the disk 212 is stationary, the lug 231 is lifted out of its notch 233 by a rotary element 244 carried by the the shaft 237. As shown in Figs. 21 and 24, the element 244 is a boss formed on the hub of the arm 236. An extension 245 of the pawl 229 lies in the path of rotation of the boss 244 and the boss is so positioned as to disengage the lug 231 at the instant when the wrist-pin 235 reaches the neutral or dead-center position shown in Fig. 21. The boss 244 has sufficient circumferential length to maintain the lug 231 out of engagement with the ratchet until the lug has been moved out of register with the notch. Thereafter the lug 231 rides back over the next tooth of the ratchet and eventually drops into the next notch 233 as shown in Fig. 24.

A train of mechanism for driving the shaft 237 comprises an internal gear 246 affixed to said shaft, a pinion 247 affixed to a counter-shaft 248 (Fig. 1), a pulley 249 also affixed to the countershaft and a belt 250 arranged to run on the pulley 249 and on a pulley 251 carried by the continuously rotating driving member 32 of the clutch.

The lacing-hooks delivered to the raceway 211 are arranged thereon, as illustrated in Fig. 27 and are prevented from being dislodged by a guard strip 252 arranged to engage, or at least lie close to, the barrels of the hooks. The raceway strip 211 conducts the lacing-hooks to an arresting member 253 (Figs. 10, 11 and 12) by which each hook is temporarily supported and from which it is pushed forward by a transferring member 254. The arresting member 253 it at the level occupied by the hook-supporting member 50 when the latter is retracted to its lowest position. When the lacing-hooks are delivered to the arresting member 253 their barrels 237 extend upwardly, the larger ends of the barrels lie upon the arresting member, and the heads of the hooks extend under the arresting member. Two horizontal and parallel guiding strips 255 extend from the arresting member 253 to the point at which the lacing-hooks are transferred to the hook-supporting member 50, said strips forming a channel 256 through which the neck 38 of a lacing-hook may pass while the margins of the guiding strips support the hook by engagement with the base or flange 39 formed at the larger end of the barrel 37. Moreover, the channel 256 extends at right angles to the delivery end of the raceway strip 211.

The arresting member 253 is mounted on a fixture 257 to which it is connected by a pivot member 258. A compression spring 259 normally maintains the member 253 in the position shown, but when the transferring member 254 is moved to transfer a hook from the member 253 to the hook-supporting member 50 it engages the back of the neck 38 of the hook and thereby causes the member 253 to swing out of the path of the hook in the direction indicated by an arrow in Fig. 11. The hook thereafter runs along the margins of the strips 255 until it passes beyond the ends of said strips and becomes seated upon the hook-supporting member 50.

Each lacing-hook, before reaching the arresting member 253, is separated from the lacing-hooks behind it and is advanced toward the arresting member by a wedge-shaped finger 260 which overlies the raceway strip 211 and is arranged to act on the upstanding barrels 37 of the hooks. The straight edge 261 of the finger 260 extends squarely across the path of the barrels of the lacing-hooks and its function is to arrest the second lacing-hook of the series and those behind it while the oblique edge of the finger is operating with a wedging effect upon the barrel of the foremost lacing-hook to propel the latter to the arresting member 253. The finger 260 and the transferring member 254 are arranged to be reciprocated horizontally in parallel lines by mechanism now to be described.

The transferring member 254 is preferably a plunger of rectangular cross-section as shown in Fig. 13, but the finger 260 is a part affixed to the forward end of a plunger 262 of similar cross-section. These two plungers are arranged in slides 263 and 264 respectively, the slides being arranged in a stationary guide 287 with which they have tongue-and groove connection. The two plungers and the two slides by which they are carried are telescopically related to permit the plungers to yield in the event that their forward movements are obstructed when the slides 263 and 264 are advanced. Each plunger is bored to provide a socket for the reception of a compression spring 265. Referring to Fig. 11, the right-hand end of each compression spring bears against its plunger while the left-hand end is seated against the corresponding slide. Lugs 266 and 267 carried respectively by the plungers are arranged in slots 268 and 269 formed in the slides to establish the normal relation of the plungers and the slides but the slots permit the slides to advance whenever the plungers are arrested.

Motion for operating both the transferring member 254 and the separating and feeding member 260 is derived from the cam 43 and is modified to suit their individual requirements by mechanism shown best in Fig. 6. It should be stated that the cooperation of these two devices requires one of them to advance while the other is being retracted and vice versa. It should also be stated that the range of travel required of the transferring member 254 is relatively long whereas that required of the member 260 should be relatively short. These conditions create mechanical problems incidental to utilizing one cam to operate both of these devices but the mechanism illustrated in Figs. 6 and 10 fulfills the requirements above set forth.

Referring to Fig. 6, the cam 43 operates a forked lever 270 mounted upon the fulcrum rod 86. The lower ends of this lever are preferably connected by a bracing device indicated as a whole at 271 to maintain the branches of the lever rigidly at the required distance apart. A link 272 is connected to the lever 270 by a pivot stud 273 and the other end of this link is connected by a pivot member 274 to a lever 275 of the first order. The choice of a lever of the first order is due to the fact that the lever 275 is utilized to furnish a relatively short range of motion to the wedge-shaped member 260. A lever 276 of the third order is provided to operate the transferring member 254, the choice in this case being due to the fact that the member 254 requires a motion of relatively long range.

The lever 275 is mounted upon a fulcrum stud 277 affixed to the frame 30. The upper end of this lever is forked and embraces a rectangular block 278 carried by the slide 264 and connected thereto by a pivot pin 279.

The lever 276 is mounted upon an eccentric portion of a fulcrum stud 280 mounted in the frame 30 and provided with a slot to receive the tip of a screw-driver whereby it may be adjusted rotatively to regulate the initial position of the transferring member 254. The fulcrum stud 280 is provided with a screw-thread and with a nut 281 by which it may be clamped to the frame 30 in any position of adjustment.

Operating motion is communicated to the lever 276 by a link 282, one end of which is connected to the lever by a pivot pin 283 and the other end of which is connected to the link 272 by a pivot pin 284. The upper end of the lever 276 is forked and embraces a rectangular block 285 carried by the slide 263 and connected thereto by a pivot pin 286. Thus, while the motions of the links 272 and 282 are coextensive the resultant motions communicated to the respective hook-engaging members 254 and 260 are long for the one and short for the other by reason of transmitting the motion for one by a lever of the third order and the motion for the other by a lever of the first order. Moreover, the combination of levers of the orders specified is advantageous for the additional reason that it furnishes an inverse relationship of the reciprocations imparted to the hook-engaging members.

The mechanism just described causes the hook-engaging members 254 and 260 to operate as follows. Assuming that the several devices occupy their initial positions as shown in Figs. 10 and 11, and that a lacing-hook lies on the arresting member 253, the first motion to occur is a motion of the hook-supporting member 50 to its hook-receiving position as shown in Figs. 9 and 12. While the member 50 dwells in this position the transferring member 254 advances toward it and at the same time the separating member 260 retreats. As the member 254 advances it propels the lacing-hook then standing in its path, the lacing-hook acting first to displace the arresting member 253 from its path and thereafter sliding along the horizontal raceway formed by the guiding strips 255. This lacing-hook is thus deposited upon the hook-supporting member 50.

Meanwhile, the separating and feeding member 260 is retracted far enough to release the lacing-hook that initially lies against its arresting edge 261. When this lacing-hook is released it is advanced by the gravitational force of the column of lacing-hooks in the raceway 211. Now the leading hook in the raceway 211 is arrested by the transferring member 254 which extends squarely across its path. Consequently, the space between the upstanding barrels of the first and second lacing-hooks of the column lies in register with the tip of the member 260 so that when this member moves forward its tip will enter between the two barrels and obstruct the path of the second lacing-hook and those behind it. Nevertheless, the advancement of the member 260 is temporarily arrested by the foremost lacing-hook which cannot yet advance because its path is still obstructed by the transferring member 254. Consequently, the continued advancement of the slide 264 is expended in compressing the spring 265 associated therewith.

In due course the transferring member 254 will have been retracted to its initial position, thereby permitting the arresting member 253 to return to its initial position as shown in Figs. 10, 11 and 12. Also, when the transferring member 254 reaches its initial position it releases the foremost lacing-hook which is thereupon propelled into its path by the spring-stressed wedge-shaped member 260. All the parts concerned with the separating and feeding of the lacing-hooks are thus restored to their initial positions leaving a lacing-hook on the arresting member 263 in readiness to be transferred to the hook-supporting member 50 during the next cycle of operations.

Having thus described my invention, what I claim as new and desire to secure by Letters Patent of the United States is:

1. A fastener-inserting machine comprising means for supplying fasteners, work-supporting means, an anvil, and regulatable power-actuated mechanism by which said anvil is moved positively to and fro to transfer fasteners from said supplying means and insert them into the work, said mechanism having two individually adjustable devices by one of which one limit of travel of said anvil may be regulated to insure registering relation of the anvil and said supplying means, and by the other of which the other limit of said travel may be regulated without affecting said registering relation.

2. A fastener-inserting machine comprising means for supplying fasteners, work-supporting means, an anvil, reciprocatory power-actuated mechanism by which said anvil is moved positively to and fro to transfer fasteners from said supplying means and insert them into the work, operating means by which said reciprocatory mechanism is moved positively to and fro, and adjustable means by which one limit of the travel of said reciprocatory mechanism may be regulated to register the anvil with said supplying means, said reciprocatory mechanism having an individually adjustable connection by which the other limit of said travel may be regulated without affecting the registering relation of the anvil and the supplying means.

3. A fastener-inserting machine comprising work-supporting means, a fastener-inserting member, means by which fasteners are delivered to said inserting member, and regulatable power-actuated mechanism by which said member is moved positively to and fro to transfer fasteners from said supplying means and insert them into the work, said mechanism having two individually adjustable devices by one of which one limit of inserting movement of said member may be regulated without affecting the other limit, the other one of said devices being effective to regulate said other limit.

4. A machine for inserting lacing-hooks comprising a plunger having an anvil for carrying and inserting a lacing-hook, a raceway arranged to supply lacing-hooks to said anvil, a lever for reciprocating said plunger, means for oscillating said lever positively, adjustable means by which oscillation of said lever may be modified to cause the anvil to register with said raceway when said lever is at one limit of its range of oscillation, and adjustable means forming a positive operating connection between said lever and said plunger, the latter said means being constructed and arranged to regulate the length of the stroke of said plunger without affecting the register of said anvil with the raceway.

5. A machine for inserting lacing-hooks comprising a plunger having an anvil to carry and insert a lacing-hook, a raceway arranged to supply lacing-hooks to said anvil, a lever for reciprocating said plunger, means for oscillating said lever positively, an adjustable eccentric fulcrum on which said lever is mounted and by which said anvil may be caused to register with said raceway when said lever is at one limit of its range of oscillation, and adjustable means forming a positive operating connection between said lever and said plunger, said adjustable means being constructed and arranged to regulate the length of the stroke imparted to the plunger without affecting the register of said anvil with the raceway.

6. A machine for inserting lacing-hooks comprising a plunger having an anvil for carrying and inserting a lacing-hook, a raceway arranged to supply lacing-hooks to said anvil, a lever for reciprocating said plunger, means for imparting oscillations of invariable length to said lever, said plunger and the lever having cooperative grooves arranged to lie in parallelism when the lever is at one limit of its range of oscillation, and means arranged partly in one of said grooves and partly in the other to form a positive operating connection between the lever and the plunger, said connecting means being adjustable lengthwise of said grooves to regulate the length of the stroke of said plunger.

7. A machine for inserting lacing-hooks comprising a plunger having an anvil for carrying and inserting a lacing-hook, means arranged to present a lacing-hook to said anvil, a lever for reciprocating said plunger, means arranged to impart oscillations of constant amplitude to said lever, said plunger and said lever having cooperative grooves arranged to lie in parallelism when said anvil is in register with said hook-presenting means, and means adjustably arranged in both of said grooves to provide a positive operating connection between the lever and the plunger and to regulate the length of the strokes imparted to the plunger.

8. A machine for inserting lacing-hooks comprising a plunger having an anvil for inserting a lacing-hook, a raceway arranged to supply lacing-hooks to said anvil, a lever for reciprocating said plunger, mechanism arranged to impart oscillations of constant amplitude to said lever, adjustable means for shifting the range of oscillation of said lever to register said anvil with the raceway when the lever is at one limit of said range, said lever and said plunger having cooperative grooves arranged to lie in parallelism when the lever is at said limit of its range of oscillation, and means arranged in both of said grooves and forming a positive operating connection between the lever and the plunger, said connecting means being adjustable lengthwise of said grooves to regulate the length of inserting motion imparted to the plunger.

9. A fastener-inserting machine comprising a plunger provided with a fastener-inserting member, a lever for reciprocating said plunger, mechanism arranged to impart oscillations of constant amplitude to said lever, the plunger and the lever having cooperative grooves arranged to lie in parallelism when the plunger is fully retracted from the work, and means arranged in both of said grooves to provide an operating connection between the lever and the plunger, said means being adjustable lengthwise of said grooves to regulate the amplitude of the reciprocations imparted to the plunger.

10. A fastener-inserting machine comprising a plunger provided with a fastener-inserting member, a lever for reciprocating said plunger, mechanism arranged to impart oscillations of constant amplitude to said lever, the plunger and the lever having cooperative grooves arranged to lie in parallelism when the plunger is fully retracted from the work, means arranged in both of said grooves to provide an operating connection between the lever and the plunger, and a screw carried by one of said grooved elements and arranged to adjust said connecting means lengthwise of said grooves and thereby regulate the amplitude of the reciprocations imparted to the plunger.

11. A fastener-inserting machine comprising a plunger having a fastener-inserting member, a lever for reciprocating said plunger, means arranged to present a fastener to said member when the plunger is fully retracted from the work, means arranged to impart oscillations of constant amplitude to said lever, said plunger and said lever having cooperative grooves arranged to lie in parallelism when the lever is fully retracted from the work, adjustable means arranged in both of said grooves and forming a positive operating connection between the lever and the plunger, and means arranged to adjust said connecting means to regulate the length of travel imparted to the plunger.

12. A hook-setting machine comprising a laterally movable anvil formed to occupy the throat of a lacing-hook while the latter is being clenched, a two-part articulated lever arranged to move said anvil to and from its operative position, resilient means carried by said lever and arranged to maintain the two parts thereof normally in a constant relation, and mechanism arranged to operate said lever in its entirety, the parts of said lever being relatively movable against the stress of said resilient means in the event of obstruction to the normal operation of the anvil.

13. A hook-setting machine comprising a laterally movable anvil formed to occupy the throat of a lacing-hook while the latter is being clenched, a two-part articulated lever arranged to move said anvil to and from its operative position, resilient means carried by said lever and arranged to maintain the two parts thereof normally in a constant relation, and mechanism arranged to operate said lever in its entirety, the parts of said lever being connected to each other by a pivot and being relatively movable about the axis of said pivot in the event of obstruction to the normal operation of the anvil or to permit manual retraction of the anvil while the machine is at rest.

14. A hook-setting machine comprising a laterally movable anvil formed to occupy the throat of a lacing-hook while the latter is being clenched, a two-part articulated lever arranged to move said anvil to and from its operative position, cooperative abutments carried by the component parts of said lever to maintain them normally in a constant relation, one of said abutments being resilient and another one being adjustable to regulate the normal relation of the parts, and mechanism arranged to operate said lever in its entirety.

15. A hook-setting machine comprising a laterally movable anvil formed to occupy the throat of a lacing-hook while the latter is being clenched, a two-part articulated lever arranged to move said anvil to and from its operative position, cooperative abutments carried by the component parts of said lever to maintain them in a constant relation during normal operation of the machine, and mechanism arranged to operate said lever in its entirety, one of said abutments being resilient to permit relative movement of the component parts of the lever in the event of obstruction to the normal operation of the anvil.

16. A hooksetting machine comprising a laterally movable anvil formed to occupy the throat of a lacing-hook while the latter is being clenched, a two-part articulated lever arranged to move said anvil to and from its operative position, controlling means carried by said lever to maintain the component parts thereof in a constant relation during normal operation of the machine, and mechanism by which one part of said lever is operated positively in opposite directions, said controlling means being constructed and arranged to cause positive operation of the other part of the lever during normal operation of the machine but including a yieldable element to permit relative movement of the component parts of the lever in the event of obstruction to movement of said other part in one direction.

17. A hook-setting machine comprising a laterally movable anvil formed to occupy the throat of a lacing-hook while the latter is being clenched, a two-part articulated lever arranged to shift said anvil to and from its operative position, mechanism including a connecting link for operating said lever to and fro in its entirety, a pivot member by which said link is connected to said lever and by which the component parts of said lever are interconnected to form an articulate joint, and cooperative means carried by said parts to maintain them in a constant relation during normal operation of the machine, one element of said means being resilient to permit individual movement of one of said parts so that said hook-inserting member may be manually shifted while the machine is at rest.

18. A hook-setting machine comprising an anvil formed to occupy the throat of a lacing-hook, a plunger by which said anvil is carried toward and from the work, a two-part articulated lever carried by said plunger and arranged to shift said anvil laterally to and from its operative position, mechanism arranged to operate said lever to and fro in its entirety, and a spring carried by said lever to maintain the component parts thereof in a constant relation during normal operation of the machine but to permit relative movement of the component parts so that said anvil may be shifted manually while the machine is at rest.

19. A hook-setting machine comprising an anvil formed to occupy the throat of a lacing-hook, a fulcrum, a two-part articulated lever arranged to shift said anvil laterally to and from its operative position, one part of said lever being mounted on said fulcrum and the other part forming an extension of the lever and having a handle portion lying adjacent to said fulcrum, a pivot connecting the parts of said lever to form its articulate joint, mechanism for operating said lever to and fro in its entirety, and a spring carried by said lever to maintain the component parts thereof in a constant relation during normal operation of the machine but to permit relative movement of said parts so that said hook-inserting member may be shifted by manipulation of said handle portion while the machine is at rest.

20. A hook-setting machine comprising an anvil formed to occupy the throat of a lacing-hook, a two-part articulated lever arranged to shift said member laterally to and from its operative position, mechanism by which one part of said lever is reciprocated positively in both directions, a pivot connecting the parts of said lever to form their articulate connection, the component parts of the lever having cooperative rigid abutments normally engaging one another to cause both parts to oscillate as one, and a spring carried by said lever to maintain said abutments in abutting relation during normal operation of the machine but to permit relative movement of the parts about said pivot in the event of obstruction to movement of said anvil in one direction.

21. A machine of the character described comprising fastener-inserting mechanism, mechanism for feeding an article of work step by step, a pair of grippers arranged to feed a strip of reinforcing material to said fastener-inserting mechanism, means arranged to operate said grippers to move the strip lengthwise with relatively long steps in one direction and with relatively short steps in the opposite direction, and means arranged to sever the strip into individual reinforcing sections.

22. A machine of the character described comprising fastener-inserting mechanism, mechanism for feeding an article of work step by step, a pair of rolls arranged to grip continuously a strip of reinforcing material, means arranged to move said rolls bodily to and fro and to rotate one of them intermittently in one direction and thereby feed the strip to said fastener-inserting mechanism, and means arranged to sever the strip into individual reinforcing sections.

23. A machine of the character described comprising fastener-inserting mechanism, mechanism for feeding an article of work step by step, a pair of rolls arranged to grip a strip of reinforcing material, mechanism arranged to operate said rolls to feed the strip to said fastener-inserting mechanism with net feeding steps shorter than the feeding steps imparted to the work, and means arranged to sever the strip into individual reinforcing sections.

24. A machine of the character described comprising fastener-inserting mechanism, mechanism for feeding an article of work step by step, a pair of grippers arranged to grip a strip of reinforcing material, mechanism operated by said work-feeding mechanism to cause said grippers to move the strip to the fastener-inserting mechanism with steps of one length and in the reverse direction with steps of another length so that the net feeding steps will be shorter than the feeding steps imparted to the work, and means arranged to sever the strip into individual reinforcing sections.

25. A machine of the character described comprising fastener-inserting mechanism, mechanism for feeding an article of work step by step, gripping means operated by said work-feeding mechanism to feed a strip of reinforcing material to said fastener-inserting mechanism with relatively long steps in one direction and with relatively short steps in the opposite direction, and means arranged to sever the strip into individual reinforcing sections.

26. A machine of the character described comprising fastener-inserting mechanism, regulatable mechanism arranged to feed an article of work with steps of variable length, frictional gripping means constructed and arranged to be operated by said work-feeding mechanism to feed a strip of reinforcing material to said inserting mechanism solely by friction with steps of uniform net length under all conditions of work feed-regulation, and means arranged to sever the strip into individual reinforcing sections.

27. A machine of the character described comprising fastener-inserting mechanism, regulatable mechanism arranged to feed an article of work with steps of variable length, a pair of members arranged to grip a strip of reinforcing material, means operated by said work-feeding mechanism to cause said members to move the strip forward and back with steps of unequal length and thereby impart net feeding steps of uniform length under all conditions of feed-regulation, and means arranged to sever the strip into individual reinforcing sections.

28. A machine of the character described comprising fastener-inserting mechanism, regulatable mechanism arranged to feed an article of work with steps of variable length, a pair of rolls arranged to grip a strip of reinforcing material, means operated by said work-feeding mechanism to cause said rolls to feed the strip to said inserting mechanism with steps of uniform net length under all conditions of feed-regulation, and means arranged to sever the strip into individual reinforcing sections.

29. A machine of the character described comprising fastener-inserting mechanism, regulatable mechanism arranged to feed an article of work with steps of variable length, a pair of members arranged to grip a strip of reinforcing material, means operated by said work-feeding mechanism to cause said members to feed the strip lengthwise in opposite directions with steps of unequal length in each cycle and being constructed and arranged to equalize the net feeding movements of the strip under all conditions of regulation of the work-feeding mechanism, and means arranged to sever the strip into individual sections.

30. A machine of the character described comprising fastener-inserting mechanism, a work-support, a presser-foot arranged to cooperate with said work-support, mechanism for periodically operating said presser-foot, work-feeding mechanism, cooperative rolls mounted on said presser-foot for gripping a strip of reinforcing material, means operated by said work-feeding mechanism to cause said rolls to feed the strip to said inserting mechanism, and means arranged to sever the strip into individual reinforcing sections.

31. A machine of the character described comprising fastener-inserting mechanism, a work-support, a presser-foot arranged to cooperate with said work-support, mechanism for periodically operating said presser-foot, work-feeding mechanism, a pair of rolls movably mounted on said presser-foot for gripping a strip of reinforcing material, mechanism constructed and arranged to reciprocate said rolls bodily lengthwise of the strip and to rotate one of them intermittently to feed the strip to said inserting mechanism, and means arranged to sever the strip into individual sections.

32. A machine of the character described comprising fastener-inserting mechanism, a work-support and a presser-foot arranged to clamp the work, mechanism for periodically operating the presser-foot, mechanism for feeding the work step by step, a member movably mounted on said presser-foot, a pair of rolls carried by said member for gripping a strip of reinforcing material, means operated by the work-feeding mechanism to reciprocate said member, means arranged to impart periodic rotational movements to one of said rolls, and means arranged to sever the strip into individual sections.

33. A machine of the character described comprising fastener-inserting mechanism, mechanism arranged to feed the work step by step, a pair of rolls arranged to grip a strip of reinforcing material, means operated by said work-feeding mechanism to reciprocate said rolls bodily and thereby move the strip lengthwise in opposite directions, means by which one of said rolls is driven intermittently in consequence of its bodily movement in one of said directions, and means arranged to sever the strip into sections.

34. A machine of the character described comprising fastener-inserting mechanism, a work-support, mechanism arranged to feed the work step by step, a presser-foot, cooperative rolls carried by said presser-foot to grip a strip of reinforcing material and feed the strip to said fastener-inserting mechanism, means arranged to drive one of said rolls step by step, and means arranged to sever the strip into sections.

35. A machine of the character described comprising fastener-inserting mechanism, mechanism arranged to feed the work step by step, a reciprocatory carrier connected to and operated by said work-feeding mechanism, a pair of rolls carried by said carrier to grip a strip of reinforcing material and feed the strip to said fastener-inserting mechanism, a ratchet operatively connected to one of said rolls, a pawl arranged to operate said ratchet in consequence of movement of said carrier in one direction, and means arranged to sever the strip into sections.

36. A machine of the character described comprising fastener-inserting mechanism, a work-support, mechanism arranged to feed the work step by step, a presser-foot, a reciprocatory member carried by and movable relatively to said presser-foot, means arranged to reciprocate said member, a pair of rolls carried by said member to grip a strip of reinforcing material and feed the strip to said fastener-inserting mechanism, a ratchet operatively connected to one of said rolls, a pawl pivotally mounted on said presser-foot to operate said ratchet in consequence of movement of said member in one direction, and means arranged to sever the strip into sections.

37. A machine of the character described comprising fastener-inserting mechanism, a work-support, reciproctory means arranged to feed the work step by step, a presser-foot, a block carried by said presser-foot but connected to said work-feeding mechanism to be reciprocated thereby in lines parallel to the lines of work-feeding movement, a roll carried by said block to feed a strip of reinforcing material to said fastener-inserting mechanism, operating means connected to said roll and to said presserfoot for driving said roll intermittently in one direction in consequence of the reciprocations imparted to said block by the work-feeding mechanism, and means arranged to sever the strip into sections.

38. In a machine of the character described, a work-support, a presser-foot, a fastener-setting device provided with a punch for forming a fastener-receiving hole in the work, means for reciprocating said device laterally to feed the work step by step, a block carried by said presser-foot but connected to said device to partake of the lateral reciprocations thereof, a roll carried by said block to feed a strip of reinforcing material to said punch, a ratchet operatively connected to said roll, a pawl pivotally mounted on said presser-foot to operate said ratchet in consequence of the reciprocations imparted to said block by said device, and means arranged to sever the strip into sections.

39. In a machine of the character described, regulatable mechanism arranged to feed the work with steps of variable length, fastener-inserting mechanism, a ratchet-and-pawl device one member of which is movable to and fro transversely of the axis of the ratchet by said work-feeding mechanism with strokes of variable length of which the longer strokes disengage the ratchet and pawl and thereby limit the rotational steps imparted to the ratchet, means operated by said ratchet to feed a strip of reinforcing material to said fastener-inserting mechanism, and means arranged to sever the strip into sections.

40. In a machine of the character described, a presser-foot, a plunger provided with a fastener-setting tool formed to punch a fastener-receiving hole in the work, regulatable means for reciprocating said plunger laterally with strokes of variable length to feed the work step by step, a support carried by said presser-foot but connected to said plunger to partake of said strokes, a roll carried by said support to feed a strip of reinforcing material to said tool, a ratchet carried by said roll, a pawl mounted on said presser-foot to drive said ratchet and said roll intermittently in consequence of said strokes, the ratchet being movable into and out of engagement with the pawl by the longer strokes of said work-feeding means, and means arranged to sever the strip into sections.

41. In a machine of the character described, fastener-setting mechanism including a plunger provided with a tool for punching a fastener-receiving hole in the work, mechanism arranged to feed a strip of reinforcing material step by step to said tool, a cutter affixed to said plunger to sever the strip, a strip-engaging member relatively to which the plunger is movable in executing its punching strokes, said member being provided with a shearing edge with which said cutter co-operates, and articulated means connecting said plunger and said member to maintain said shearing edge in shearing relation to said cutter, said means including an adjustable eccentric element by which the pressure of the shearing elements, one against the other, may be regulated.

42. In a machine of the character described, fastener-setting mechanism including a plunger provided with a tool for punching a hole in the work and for feeding the work, a reciprocatory feed-carriage in which said plunger is arranged to slide, mechanism arranged to feed a strip of reinforcing material step by step to said tool, a cutter affixed to said plunger to sever the strip, a strip-engaging member relatively to which the plunger is movable in executing its punching stroke, a pressure-foot by which said member is carried, said member being provided with a shearing edge with which said cutter cooperates, and articulated means connecting said member and said feed-carriage to maintain said shearing edge in shearing relation to said cutter, said means comprising a cylindric stem and a guide therefor parallel to said plunger and carried one by the feed-carriage and the other by said strip-engaging member, and said stem having portions eccentrically related to each other so that by rotational adjustment of the stem the pressure of the shearing elements, one against the other, may be regulated.

43. A hook-inserting machine comprising a hook-inserting member, a raceway arranged to supply lacing-hooks to said member, two parallel plungers, one arranged to transfer a hook from the raceway to said hook-inserting member, and the other formed and arranged to feed a hook along the raceway and into the path of said transferring plunger, a reciprocatory operating member, and two operating connections both actuated by said operating member but running, respectively, to said plungers said connections being constructed and arranged to impart a relatively long operating stroke to one of said plungers and a relatively short operating stroke to the other.

44. A hook-inserting machine comprising a hook-inserting member, a raceway arranged to supply lacing-hooks to said member, a device arranged to separate the leading hook in the raceway from those behind it, a feeding member arranged to transfer the separated hook from the raceway to said hook-inserting member, a short-stroke lever of the first order arranged to reciprocate said separating device, a long-stroke lever of the third order arranged to reciprocate said feeding member, a reciprocatory operating member, and links connecting said levers respectively with said operating member.

In testimony whereof I have signed my name to this specification.

PERLEY R. GLASS.